Dec. 18, 1962  H. F. STERLING ETAL  3,069,241
MANUFACTURE OF HIGH PURITY SILICON
Filed Feb. 26, 1959
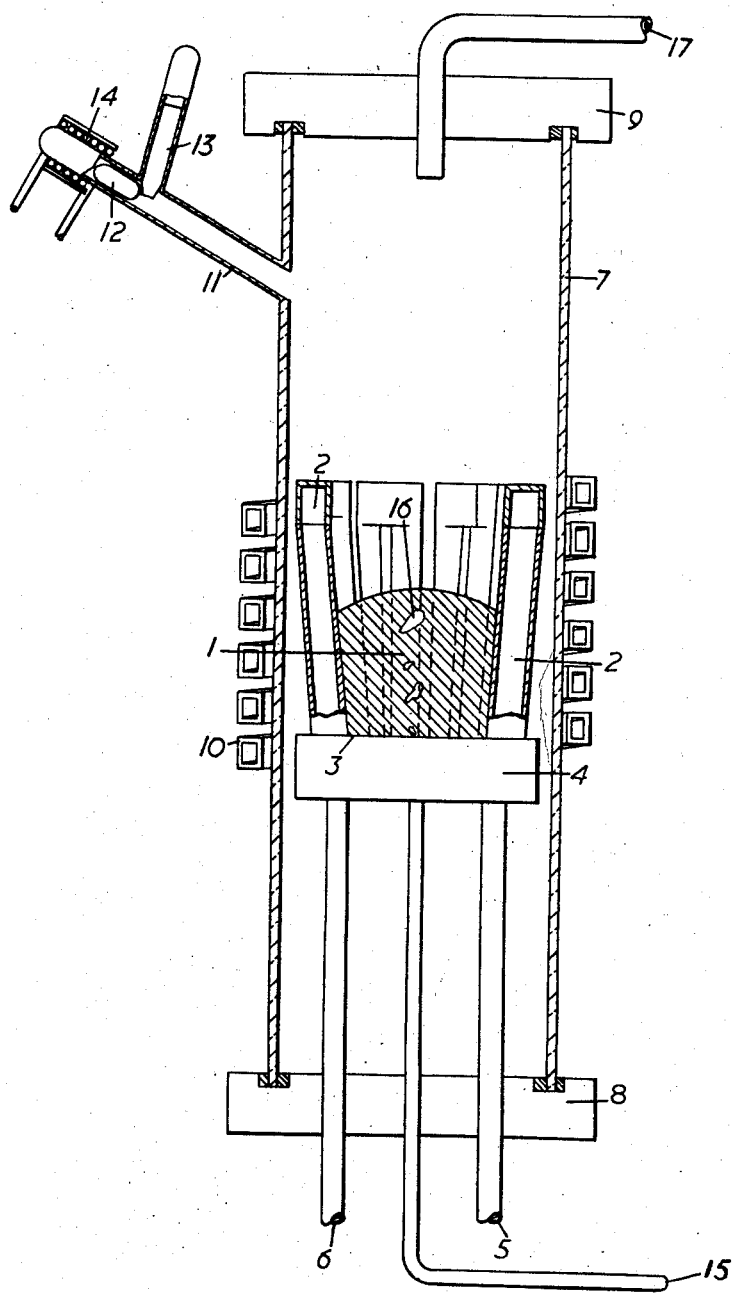
Inventor
H. F. STERLING
F. J. RAYMOND
By
Attorney 3,069,241
MANUFACTURE OF HIGH PURITY SILICON
Henley Frank Sterling and Frederick John Raymond, London, England, assignors to International Standard Electric Corporation, New York, N.Y.
Filed Feb. 26, 1959, Ser. No. 795,736
Claims priority, application Great Britain Mar. 21, 1958
2 Claims. (Cl. 23—223.5)

This invention relates to the manufacture of semiconductor elements of high purity and more particularly to those semiconductor elements which have gaseous hydrides capable of being decomposed thermally.

The production of silicon by the thermal decomposition of silane was described in British Patent No. 745,698 (Wilson et al.) whilst in British Patent No. 778,383 (Scott et al.) the process was extended to other materials. It has proved successful in producing semiconductor materials of high purity but suffers from certain limitations on the amount of material that can be produced in a given time.

It is the object of the present invention to provide a process for the manufacture of high purity semiconductor elements that does not suffer from these limitations.

According to the present invention there is provided a method of producing a semiconductor element of high purity in which a gaseous hydride of the element is thermally decomposed by being passed through a molten charge of the element.

Examples of semiconductor elements which have a gaseous hydride that is capable of being thermally decomposed to give hydrogen and the material itself are silicon, germanium and boron.

Preferably the hydride is passed into the molten semiconductor element from below so as to bubble through it. The hydride decomposes and the hydrogen resulting from the decomposition bubbles up through the molten element and forms a protective atmosphere above it.

In general in the decomposition of the hydride of a semiconductor element, two or more molecules of hydrogen are given for each molecule of the hydride decomposed. For example in the decomposition of silane two molecules of hydrogen are liberated for each molecule of silane decomposed and the molten silicon is vigorously stirred. It is therefore necessary to regulate the flow of silane or appropriate hydride, in relation to the capacity of the holding crucible and the volume of molten element contained in it, to prevent the molten element being blown out of the crucible.

It has been shown in United States application Ser. No. 708,100, filed January 10, 1958 (Warren), that silicon can be melted and processed in a crucible of the kind used in the present process without contamination of the silicon from the walls of the crucible. The present invention, therefore, results in the production of silicon of a purity equal to that resulting from the process of British Patent No. 745,698 but on a larger scale.

One form of apparatus for carrying out the invention is shown in the accompanying drawing. This apparatus is particularly suitable for the preparation of silicon and the following description is of that application of the apparatus.

Referring to the drawing, molten silicon 1 is contained within a crucible constructed of a number of hollow tubes 2, in accordance with application Ser. No. 795,718, filed February 26, 1959 (Sterling et al.). The tubes 2 are each ¼ inch diameter and spaced from one another by gaps each of 1/16 inch. They are sealed through a metal base 3 and communicate with a hollow member 4. Cooling water is circulated through the member 4 and tubes 2 by means of inlet and outlet tubes 5 and 6. The crucible is supported within a vertical cylinder 7 of silica sealed at bottom and top by closure members 8 and 9. The tubes 2 and base member 3 are made of metal of high electrical and thermal conductivity such as copper or silver.

A coil 10 supplied with high frequency energy from a source not shown is located around the crucible but externally of the silica cylinder 7. The turns of the coil 10 are hollow conductors through which cooling water way be circulated.

A side tube 11 is sealed into the wall of cylinder 7 and an initial charge for the crucible in the form of a slug 12 of silicon is placed in this side tube. The slug 12 is held by a plunger 13 of magnetic material, a susceptor 14 heated by a heating coil surrounds the slug 12. This heats the slug 12 up to a temperature at which the resistance thereof has decreased sufficiently for eddy current of appreciable magnitude to be induced therein. The plunger 13 is then moved, as by an external magnet, to allow the slug 12 to fall into the crucible, whereupon the silicon is melted by currents induced therein from the coil 10 and from eddy currents in the walls of tubes 2. Molten silicon does not escape through the gaps between the tubes which form the crucible of this embodiment it being held within the crucible by surface tension and by the high frequency field used to induce eddy currents in the molten silicon.

Silane is then supplied through an inlet pipe 15 which projects through the base 3. The silane bubbles through the molten silicon as shown at 16 and becomes decomposed to silicon, which melts in the crucible, and hydrogen, which bubbles up through the remainder of the molten silicon and is drawn off through an outlet pipe 17 sealed through the upper closure member 9.

After the supply of silane has been cut off, a monocrystal of silicon may be pulled from the molten silicon within this crucible.

It should be noted that it is not possible to melt semiconductor elements contained within a cylindrical metal crucible with a continuous wall by means of an induction coil surrounding the outside of the vessel, since a continuous wall would short circuit induced currents from the induction coil and prevent them from reaching the semiconductor element. With a crucible constructed of hollow tubes, however, eddy currents are induced in the separate tubes, which thus act to concentrate the electric field. The eddy currents therein induce eddy currents in the semiconductor element, in addition to the field of the induction coil itself penetrating to the semiconductor element through the spaces between the tubes. It is also possible to melt semiconductor elements contained within a metal crucible with a continuous wall by means of an induction coil surrounding the outside of the vessel provided that the walls do not form a complete cylinder. Such an apparatus is described in the above application Ser. No. 708,100 (Warren).

While the principles of the invention have been described above in connection with specific embodiments, and particular modifications thereof, it is to be clearly understood that this description is made only by way of example and not as a limitation on the scope of the invention.

What we claim is:
1. A method of producing silicon of high purity comprising placing a charge of silicon in a crucible with hollow walls made from a metal of high thermal and electrical conductivity, circulating cooling fluid through the said walls, melting the charge of silicon by means of high frequency currents in an electric induction coil surrounding the crucible, and bubbling silane gas through the molten silicon.
2. A method according to claim 1 in which the silicon is preheated before being placed in the crucible.

(References on following page)

References Cited in the file of this patent

UNITED STATES PATENTS 2,768,074  Stauffer _____ Oct. 23, 1956

FOREIGN PATENTS 792,166  Great Britain _____ Mar. 19, 1958
546,346  Canada _____ Sept. 17, 1957

OTHER REFERENCES

"Research," vol. 12, 1959, page 95.
Pfann: "Zone Melting," John Wiley & Sons, Inc. (1958), pages 79–84.